United States Patent
Hou et al.

(10) Patent No.: US 10,599,866 B2
(45) Date of Patent: Mar. 24, 2020

(54) METHOD AND SYSTEM FOR PROTECTING PERSONAL INFORMATION BASED ON MOBILE TERMINAL AND THE MOBILE TERMINAL

(71) Applicant: HUIZHOU TCL MOBILE COMMUNICATION CO., LTD., Huizhou, Guangdong (CN)

(72) Inventors: Shihua Hou, Huizhou (CN); Li Sun, Huizhou (CN); Xin Jin, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 212 days.

(21) Appl. No.: 15/554,111

(22) PCT Filed: Sep. 5, 2016

(86) PCT No.: PCT/CN2016/098020
§ 371 (c)(1),
(2) Date: Aug. 28, 2017

(87) PCT Pub. No.: WO2017/107558
PCT Pub. Date: Jun. 29, 2017

(65) Prior Publication Data
US 2018/0053013 A1 Feb. 22, 2018

(30) Foreign Application Priority Data
Dec. 23, 2015 (CN) .......................... 2015 1 0977973

(51) Int. Cl.
*G06F 21/62* (2013.01)
*G06F 21/88* (2013.01)
(Continued)

(52) U.S. Cl.
CPC .......... *G06F 21/6245* (2013.01); *G06F 21/88* (2013.01); *H04W 12/002* (2019.01);
(Continued)

(58) Field of Classification Search
CPC ................. G06F 21/6245; G06F 21/88; G06F 2221/2111; H04W 12/0023; H04W 12/002; H04W 12/02
See application file for complete search history.

(56) References Cited

U.S. PATENT DOCUMENTS

2005/0278333 A1* 12/2005 Daniels ............... G06F 21/6245
2013/0021240 A1 1/2013 Coulon
(Continued)

FOREIGN PATENT DOCUMENTS

| CN | 103581417 A | 2/2014 |
|---|---|---|
| CN | 104618864 A | 5/2015 |
| CN | 105574436 A | 5/2016 |

OTHER PUBLICATIONS

Andriatsimandefitra et al., Designing information flow policies for Android's operating system, IEEE, 2012 IEEE International Conference on Communications (ICC), Jun. 10-15, 2012 (Year: 2012).*
(Continued)

*Primary Examiner* — Luu T Pham
*Assistant Examiner* — Harvey I Cohen (57) ABSTRACT

The present disclosure provides a method for protecting personal information based on a mobile terminal including establishing and storing a new content provider module for storing application data and a new position manager module for storing geographical position data in the mobile terminal in advance, and writing default new application data and default new geographical position data into the new content provider module and the new position manager module, respectively; monitoring, in real time, whether an original
(Continued)

content provider and an original position manager module in the mobile terminal include a request for reading data from transmitted by an application; if yes, disabling the original content provider and the original position manager module, and displaying the default new application data and the default new geographical position data. The present disclosure protects the personal information of a user.

8 Claims, 5 Drawing Sheets

(51) Int. Cl.
    *H04W 12/00*     (2009.01)
    *H04W 12/02*     (2009.01)
(52) U.S. Cl.
    CPC ....... *H04W 12/0023* (2019.01); *H04W 12/02* (2013.01); *G06F 2221/2111* (2013.01)

(56) References Cited

U.S. PATENT DOCUMENTS

| | | | |
|---|---|---|---|
| 2013/0145457 A1* | 6/2013 | Papakipos | G06F 21/6245 726/19 |
| 2014/0189804 A1* | 7/2014 | Lehmann | H04L 63/105 726/4 |
| 2015/0082371 A1* | 3/2015 | DeWeese | H04L 63/20 726/1 |
| 2015/0199523 A1* | 7/2015 | Hamilton | G06F 21/60 726/27 |
| 2015/0339492 A1* | 11/2015 | Mizhen | G06F 21/6245 726/26 |
| 2016/0042191 A1* | 2/2016 | Enck | G06F 21/6218 726/1 |
| 2016/0170730 A1* | 6/2016 | Ollikainen | G06F 21/6245 717/175 |

OTHER PUBLICATIONS

Hochreiner et al,. Towards Practical Methods to Protect the Privacy of Location Information with Mobile Devices, ACM, 2014, SIN14 Proceedings of the 7th International Conference on Security of Information and Networks, Glasgow Scotland UK, Sep. Sep. 9-11, 2014 (Year: 2014).*

Zhao et al., The design and implementation of invisible eavesdropping protection application, IEEE, 2014 12th International Conference on Signal Processing (ICSP), Oct. 19-23, 2014 (Year: 2014).*

* cited by examiner

METHOD AND SYSTEM FOR PROTECTING PERSONAL INFORMATION BASED ON MOBILE TERMINAL AND THE MOBILE TERMINAL

CROSS REFERENCE TO RELATED APPLICATIONS

This application claims priority to International Application No. PCT/CN2016/098020, filed on Sep. 5, 2016, which claims priority to Chinese Application No. 2015109779735, filed on Dec. 23, 2015. The entire disclosures of the above applications are incorporated herein by reference.

BACKGROUND

Field

The present disclosure relates to technology field of mobile terminals, and more particularly to a method and a system for protecting personal information based on a mobile terminal and the mobile terminal.

Background

With the development of science and technology, mobile terminals, such as mobile phones, occupy a more and more important position in people's lives. More and more applications of the mobile phones have emerged, and more and more applications involve personal information which users do not want to be shared by other people, such as address books, photos, location information, etc. At present, operating systems of intelligent mobile terminals are designed by open source systems except for the IOS system. Accordingly, a problem that the personal information is stolen occurs easily. Leaking the personal information brings irreparable losses to the users and brings significant inconvenience for the users.

Consequently, the prior art should be improved and enhanced.

DISCLOSURE OF THE INVENTION

Technical Problems

Based on the above-mentioned deficiencies in the prior art, an objective of the present disclosure is to provide a method and a system for protecting personal information based on a mobile terminal and the mobile terminal aiming to protect personal information of a user stored in the mobile terminal effectively and to provide convenience for the user.

Solutions to the Problems

Technical Solutions

Technical schemes of the present disclosure are described as follows.

A method for protecting personal information based on a mobile terminal, wherein the method comprises steps of:

Establishing and storing a new content provider module for storing application data and a new position manager module for storing geographical position data in the mobile terminal in advance, and writing default new application data and default new geographical position data into the new content provider module and the new position manager module, respectively;

Monitoring, in real time, whether an original content provider and an original position manager module in the mobile terminal include a request for reading data transmitted by an application;

Disabling the original content provider and the original position manager module, and displaying the default new application data and the default new geographical position data, if yes; and Activating the original content provider and the original position manager module when the new original content provider and the new position manager module are disabled.

The step of establishing and storing the new content provider module for storing the application data and the new position manager module for storing the geographical position data in the mobile terminal in advance, and writing the default new application data and the default new geographical position data into the new content provider module and the new position manager module specifically comprises steps of:

Establishing the new content provider module and the new position manager module in the mobile terminal in advance;

Writing the default new application data into the new content provider module; and Writing the default new geographical position data into the new position manager module.

The step of disabling the original content provider and the original position manager module, and displaying the default new application data and the default new geographical position data, if yes, specifically comprises steps of:

Detecting that the application in the mobile terminal transmits the request for reading original application data stored in the original content provider module;

Disabling the original content provider module, and enabling the new content provider module; and Reading the corresponding new application data according to the new content provider module and displaying the same; and Disabling the new content provider module.

The step of disabling the original content provider and the original position manager module, and displaying the default new application data and the default new geographical position data, if yes, specifically comprises steps of:

Detecting that the application in the mobile terminal transmits the request for reading original geographical position data stored in the original position manager module;

Disabling the original position manager module, and enabling the new position manager module; and Reading the corresponding new geographical position data according to the new position manager module and displaying the same; and Disabling the new position manager module.

The default new application data at least comprises data of an address book and data of a short message.

A method for protecting personal information based on a mobile terminal, wherein the method comprises steps of:

Establishing and storing a new content provider module for storing application data and a new position manager module for storing geographical position data in the mobile terminal in advance, and writing default new application data and default new geographical position data into the new content provider module and the new position manager module, respectively;

Monitoring, in real time, whether an original content provider and an original position manager module in the mobile terminal include a request for reading data transmitted by an application; and Disabling the original content provider and the original position manager module, and displaying the default new application data and the default new geographical position data, if yes.

The step of establishing and storing the new content provider module for storing the application data and the new position manager module for storing the geographical position data in the mobile terminal in advance, and writing the default new application data and the default new geographical position data into the new content provider module and the new position manager module specifically comprises steps of:

Establishing the new content provider module and the new position manager module in the mobile terminal in advance;

Writing the default new application data into the new content provider module; and Writing the default new geographical position data into the new position manager module.

The step of disabling the original content provider and the original position manager module, and displaying the default new application data and the default new geographical position data, if yes, specifically comprises steps of:

Detecting that the application in the mobile terminal transmits the request for reading original application data stored in the original content provider module;

Disabling the original content provider module, and enabling the new content provider module; and Reading the corresponding new application data according to the new content provider module and displaying the same; and Disabling the new content provider module.

The step of disabling the original content provider and the original position manager module, and displaying the default new application data and the default new geographical position data, if yes, specifically comprises steps of:

Detecting that the application in the mobile terminal transmits the request for reading original geographical position data stored in the original position manager module;

Disabling the original position manager module, and enabling the new position manager module; and Reading the corresponding new geographical position data according to the new position manager module and displaying the same; and Disabling the new position manager module.

The default new application data at least comprises data of an address book and data of a short message.

A system for protecting personal information based on a mobile terminal, wherein the system comprises:

A new data pre-storage module configured to establish and store a new content provider module for storing application data and a new position manager module for storing geographical position data in the mobile terminal in advance, and configured to write default new application data and default new geographical position data into the new content provider module and the new position manager module, respectively;

A real-time monitoring module configured to monitor, in real time, whether an original content provider and an original position manager module in the mobile terminal include a request for reading data transmitted by an application; and A new data displaying module configured to disable the original content provider and the original position manager module, and configured to display the default new application data and the default new geographical position data, if a monitoring result is yes.

The new data pre-storage module specifically comprises:

A module presetting unit configured to establish the new content provider module for storing the application data and the new position manager module for storing the geographical position data in the mobile terminal in advance;

A first new data writing unit configured to write the default new application data into the new content provider module; and A second new data writing unit configured to write the default new geographical position data into the new position manager module.

The new data displaying module specifically comprises:

A first detecting unit configured to detect that the application in the mobile terminal transmits the request for reading application data stored in the original content provider module;

A first enabling unit configured to disable the original content provider module and configured to enable the new content provider module;

A first data displaying unit configured to read the corresponding new application data according to the new content provider module and configured to display the same; and A first disabling unit configured to disable the new content provider module.

The new data displaying module specifically comprises:

A second detecting unit configured to detect that the application in the mobile terminal transmits the request for reading geographical position data stored in the original position manager module;

A second enabling unit configured to disable the original position manager module and configured to enable the new position manager module;

A second data displaying unit configured to read the corresponding new geographical position data and configured to display the same; and A second disabling unit configured to disable the new position manager module.

A mobile terminal, wherein the mobile terminal comprises a system for protecting personal information based on the mobile terminal, wherein the system comprises:

A new data pre-storage module configured to establish and store a new content provider module for storing application data and a new position manager module for storing geographical position data in the mobile terminal in advance, and configured to write default new application data and default new geographical position data into the new content provider module and the new position manager module, respectively;

A real-time monitoring module configured to monitor, in real time, whether an original content provider and an original position manager module in the mobile terminal include a request for reading data transmitted by an application; and A new data displaying module configured to disable the original content provider and the original position manager module, and configured to display the default new application data and the default new geographical position data, if a monitoring result is yes.

The new data pre-storage module specifically comprises:

A module presetting unit configured to establish the new content provider module for storing the application data and the new position manager module for storing the geographical position data in the mobile terminal in advance;

A first new data writing unit configured to write the default new application data into the new content provider module; and A second new data writing unit configured to write the default new geographical position data into the new position manager module.

The new data displaying module specifically comprises:

a first detecting unit configured to detect that the application in the mobile terminal transmits the request for reading application data stored in the original content provider module;

A first enabling unit configured to disable the original content provider module and configured to enable the new content provider module;

A first data displaying unit configured to read the corresponding new application data according to the new content provider module and configured to display the same; and A first disabling unit configured to disable the new content provider module.

The new data displaying module specifically comprises:

A second detecting unit configured to detect that the application in the mobile terminal transmits the request for reading geographical position data stored in the original position manager module;

A second enabling unit configured to disable the original position manager module and configured to enable the new position manager module;

A second data displaying unit configured to read the corresponding new geographical position data and configured to display the same; and A second disabling unit configured to disable the new position manager module.

Advantageous Effects of the Invention

Advantageous Effects

The present disclosure provides a method and a system for protecting personal information based on a mobile terminal and the mobile terminal. The method includes establishing and storing a new content provider module for storing application data and a new position manager module for storing geographical position data in the mobile terminal in advance, and writing default new application data and default new geographical position data into the new content provider module and the new position manager module, respectively; monitoring, in real time, whether an original content provider and an original position manager module in the mobile terminal include a request for reading data from transmitted by an application; if yes, disabling the original content provider and the original position manager module, and displaying the default new application data and the default new geographical position data. In the present disclosure, the new content provider module and the new position manager module are established. New virtual information is written into the two modules. When any other application requires calling the data in the two modules, the mobile terminal outputs the virtual information, thereby protecting the personal information of the user and providing convenience for the user.

BEST EMBODIMENT FOR CARRYING OUT THE INVENTION

Best Mode for Carrying Out the Invention

The present disclosure discloses a method and a system for protecting personal information based on a mobile terminal and the mobile terminal. To make the objectives, technical schemes, and technical effects of the present disclosure more clear and definite, the present disclosure will be described in details below by using embodiments in conjunction with the appending drawings. It should be understood that the specific embodiments described herein are merely for explaining the present disclosure and are not intended to limit the present disclosure.

Figure 1:
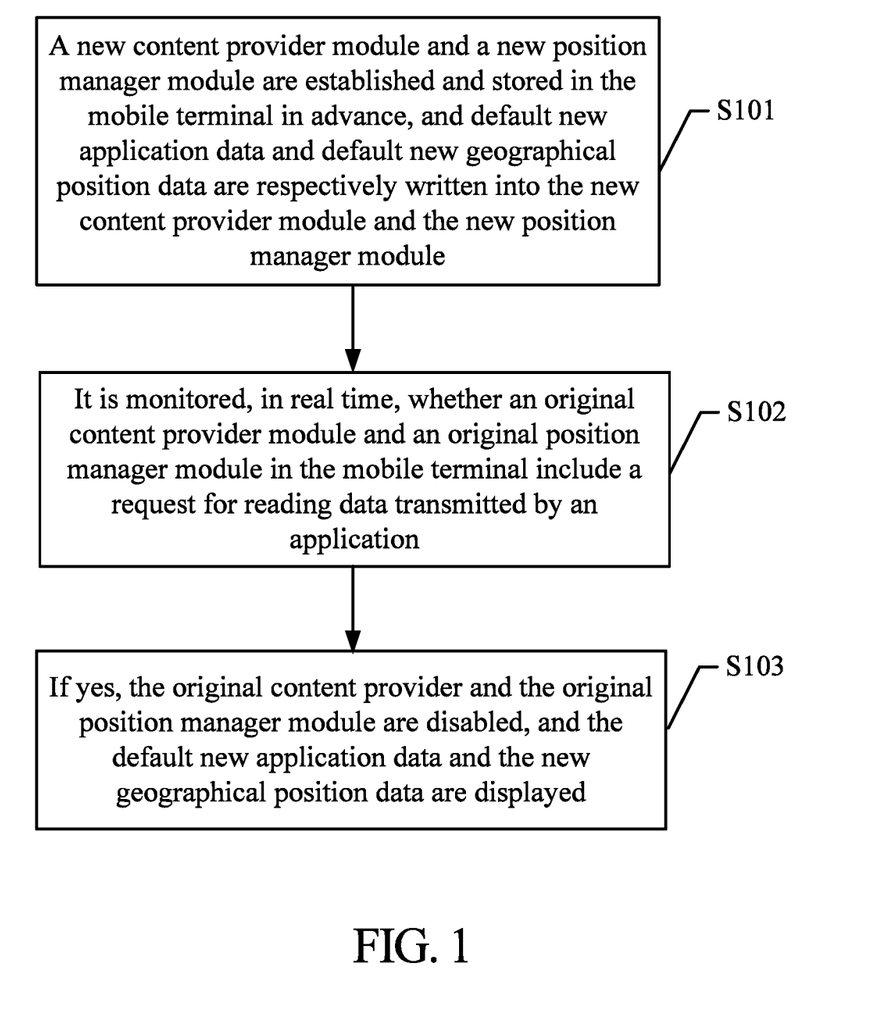
FIG. 1 is a flowchart of a method for protecting personal information based on a mobile terminal in accordance with a preferred embodiment of the present disclosure.

Please refer to FIG. 1. FIG. 1 is a flowchart of a method for protecting personal information based on a mobile terminal in accordance with a preferred embodiment of the present disclosure. The method includes the following steps.

In step S101, a new content provider module and a new position manager module are established and stored in the mobile terminal in advance, and default new application data and default new geographical position data are respectively written into the new content provider module and the new position manager module.

In the embodiment of the present disclosure, step S101 specifically includes the following steps.

In S11, the new content provider module for storing application data and the new position manager module for storing geographical position data are established in the mobile terminal in advance.

In step S12, the default new application data is written into the new content provider module.

In step S13, the default new geographical position data is written into the new position manager module.

Figure 2:
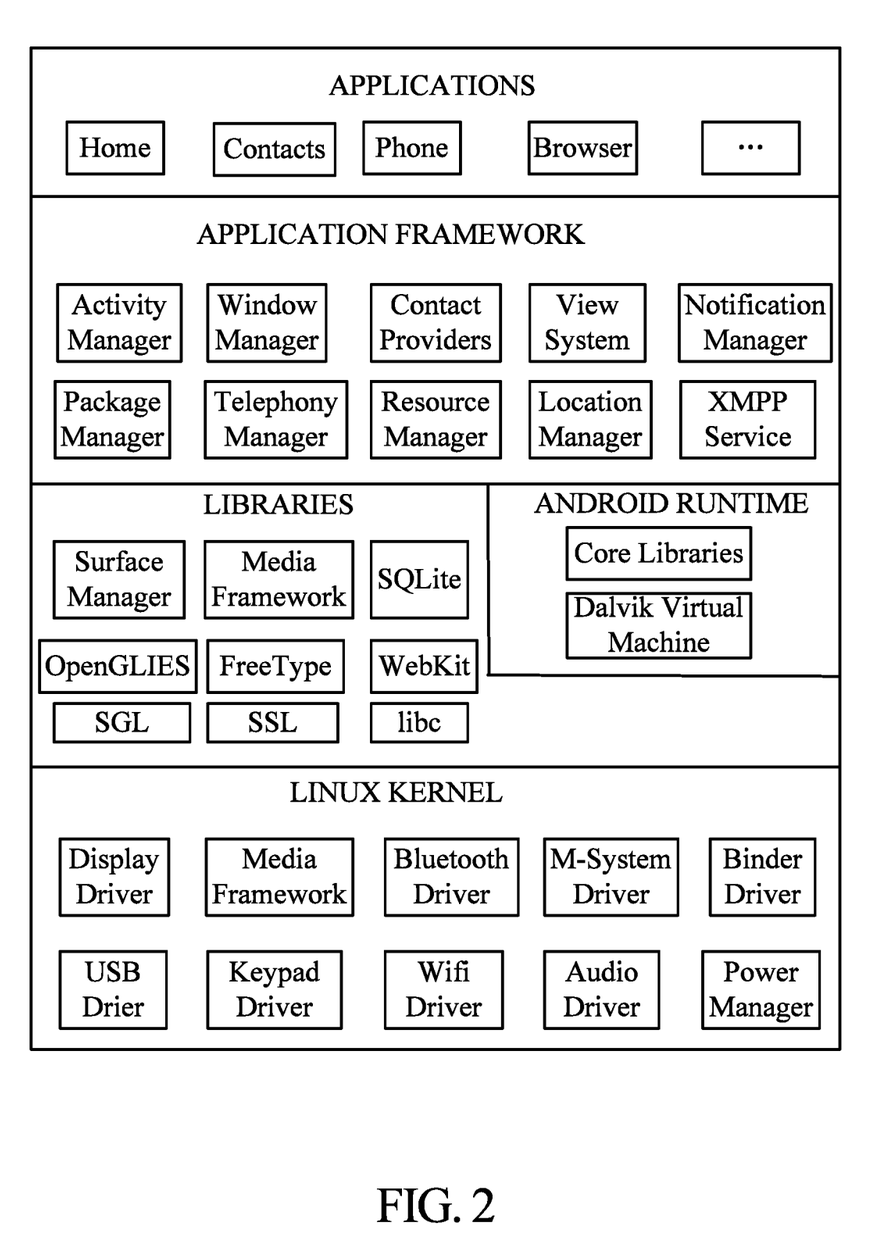
FIG. 2 is an example of an application of a method for protecting personal information based on a mobile terminal of the present disclosure.

In practice, when an application in an ANDROID system in a mobile phone requires acquiring personal information, such as address book information, a short message, information of a geographical position, information of a WIFI hotspot, and so on, it is required to read data via a corresponding interface of a framework in the system. Please refer to an embodiment as shown in FIG. 2, functions of main modules of the framework in the system are described as follows.

(1) A viewing module has many extensible set of views and can be configured to construct an application. The viewing module includes lists, grids, text boxes, buttons, and even an embedded browser.

(2) A content provider module is configured to enable an application to access data of any other application (e.g., an address book) or share data per se.

(3) A resource manager module is configured to provide accessing of non-code resources, such as localized strings, graphics, and layout files.

(4) A notification manager module is configured to enable all applications to display a self-defined warning in a status bar.

(5) An activity manager module is configured to manage a life cycle of an application and configured to provide a reverting function.

(6) A location manager module is configured to manage information of a geographical position of a user.

The embodiment of the present disclosure mainly focuses on the content provider module and the location manager module. That is, a key point is to prevent an address book/a short message/information of a geographical position of a user (and any other personal privacy data) from being stolen. Accordingly, in the embodiment of the present disclosure, the new content provider module and the new location manager module are established in the ANDROID system in the mobile phone in advance. The default new application data and the default new geographical position data are respectively written into the new content provider module and the new position manager module. The new application data and the new geographical position data are user self-defined virtual information.

In step S102, it is monitored, in real time, whether an original content provider module and an original position manager module in the mobile terminal include a request for reading data transmitted by an application.

In step S103, if yes, the original content provider and the original position manager module are disabled, and the default new application data and the new geographical position data are displayed.

In the embodiment of the present disclosure, step S103 specifically includes the following steps.

In step S311, it is detected that the application in the mobile terminal transmits the request for reading application data stored in the original content provider module.

In step S312, the original content provider module is disabled, and the new content provider module is enabled.

In step S313, the corresponding new application data is read according to the new content provider module and displayed the same.

In step S314, the new content provider module is disabled.

Further, step S103 includes the following steps.

In step S321, it is detected that the application in the mobile terminal transmits the request for reading geographical position data stored in the original position manager module.

In step S322, the original position manager module is disabled, and the new position manager module is enabled.

In step S323, the corresponding geographical position data is read according to the new position manager module and displayed the same.

In step S324, the new position manager module is disabled.

That is, when it is monitored that the application calls the two modules to read the personal information (such as a geographical position, an address book, and so on), the system activates and utilizes the new content provider module and the new position manager module, and the two original modules of the system are disabled at the same time. At this time, the new modules provide the virtual information for the application. When the user disables the two new modules, the original modules of the system are activated. The system is restored to be normal.

Figure 3:
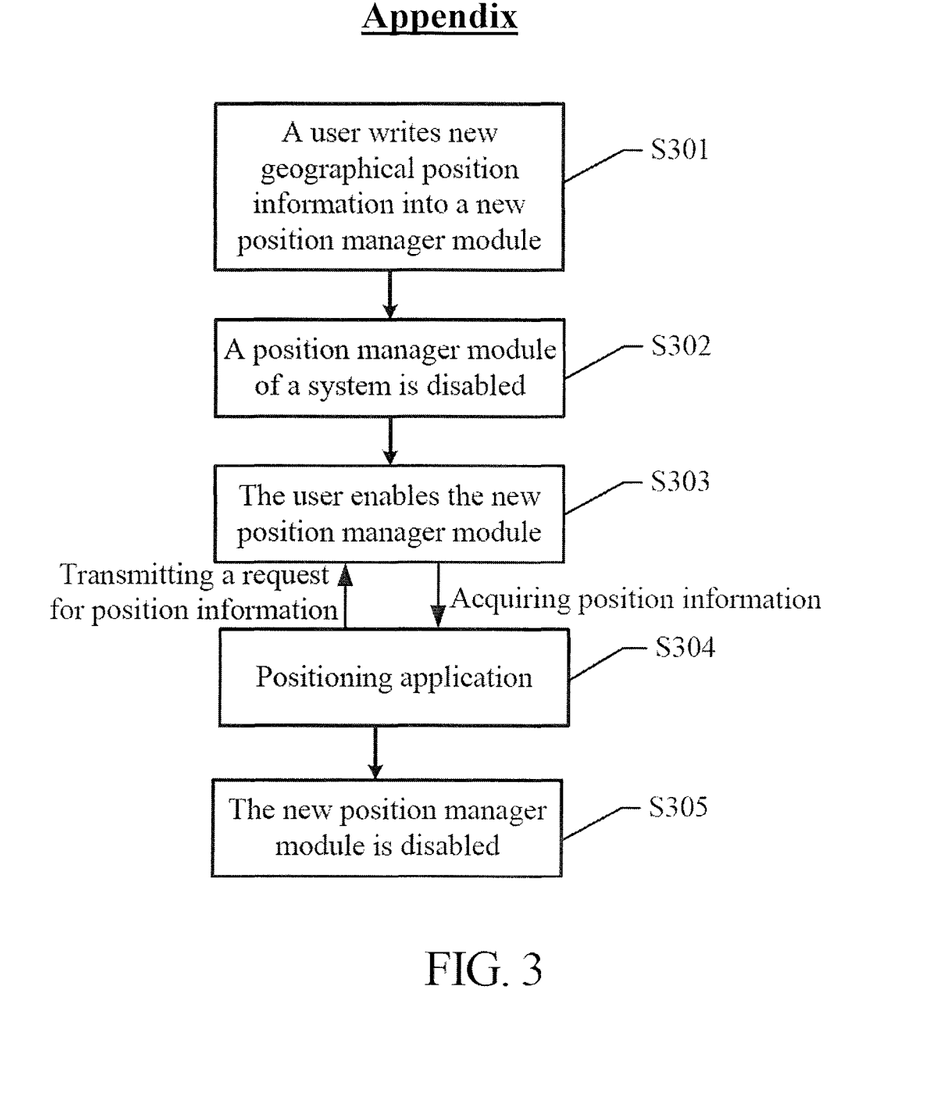
FIG. 3 is a flowchart of an application example of a method for protecting personal information based on a mobile terminal of the present disclosure.

The present disclosure is further described with the following specific application example. Taking information of a geographical position in personal privacy information as a reference example, a specific flowchart is shown in FIG. 3.

In step S301, a user establishes a new position manager module in advance and writes new geographical position information into the new position manager module. The new geographical position information is user self-defined information of a virtual position.

In step S302, when it is detected that a positioning application calls geographical position information, a position manager module of a system is disabled.

In a practical application, the system monitors whether an application transmits a request for the geographical position information via an application programming interface (API).

In step S303, the user activates and enables the new position manager module.

In step S304, the new position manager module communicates with the positioning application. The positioning application transmits the request for the geographical position information. The new position manager module transmits the default virtual geographical position information and displays the same after receiving the request.

In step S305, the new position manager module is disabled.

It can be seen from above that the new content provider module and the new position manager module are established in the present disclosure. New virtual information is written into the two modules. When any other application requires calling the data in the two modules, the mobile terminal outputs the virtual information, thereby protecting the personal information of the user and providing convenience for the user.

A person skilled in the art can appreciate that all or a part of functions and/or all or a part of steps in the above-mentioned method of the embodiment may be implemented by instructing corresponding hardware with computer programs. All programs may be stored in a computer readable storage medium. The programs which are executed may include the steps in the above-mentioned method of the embodiment. The storage medium may be a disk, an optical disk, a read-only memory (ROM), or a random access memory (RAM).

Figure 4:
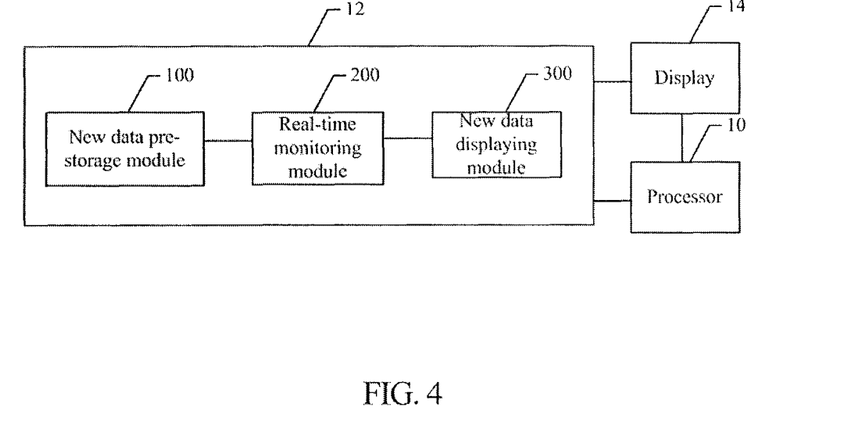
FIG. 4 is a functional block diagram of a system for protecting personal information based on a mobile terminal in accordance with a preferred embodiment of the present disclosure.

Based on the above-mentioned embodiment, the present further provides a system for protecting personal information based on a mobile terminal. As shown in FIG. 4, the system includes a processor, 10, a memory 12, and a display 14. All of the modules 100, 200, and 300 as introduced below are stored in the memory 12. When the modules 100, 200, and 300 are executed by the processor 10, the memory 12 causes the processor 10 to perform a method.

A new data pre-storage module 100 is configured to establish and store a new content provider module for storing application data and a new position manager module for storing geographical position data in the mobile terminal in advance, and configured to write default new application data and default new geographical position data into the new content provider module and the new position manager module, respectively. A specific embodiment is mentioned above.

A real-time monitoring module 200 is configured to monitor, in real time, whether an original content provider and an original position manager module in the mobile terminal include a request for reading data transmitted by an application. A specific embodiment is mentioned above.

A new data displaying module 300 is configured to disable the original content provider and the original position manager module, and configured to display the default new application data and the default new geographical position data, if a monitoring result is "yes". A specific embodiment is mentioned above.

Further, the new data pre-storage module 100 specifically includes the following units.

A module presetting unit is configured to establish the new content provider module for storing the application data and the new position manager module for storing the geographical position data in the mobile terminal in advance. A specific embodiment is mentioned above.

A first new data writing unit is configured to write the default new application data into the new content provider module. A specific embodiment is mentioned above.

A second new data writing unit is configured to write the default new geographical position data into the new position manager module. A specific embodiment is mentioned above.

Further, the new data displaying module 300 specifically includes the following units.

A first detecting unit is configured to detect that the application in the mobile terminal transmits the request for reading application data stored in the original content provider module. A specific embodiment is mentioned above.

A first enabling unit is configured to disable the original content provider module and configured to enable the new content provider module. A specific embodiment is mentioned above.

A first data displaying unit is configured to read the corresponding new application data according to the new content provider module and configured to display the same. A specific embodiment is mentioned above.

A first disabling unit is configured to disable the new content provider module. A specific embodiment is mentioned above.

Further, the new data displaying module 300 specifically includes the following units.

A second detecting unit is configured to detect that the application in the mobile terminal transmits the request for reading geographical position data stored in the original position manager module. A specific embodiment is mentioned above.

A second enabling unit is configured to disable the original position manager module and configured to enable the new position manager module. A specific embodiment is mentioned above.

A second data displaying unit is configured to read the corresponding new geographical position data and configured to display the same. A specific embodiment is mentioned above.

A second disabling unit is configured to disable the new position manager module. A specific embodiment is mentioned above.

Further, the present disclosure provides a mobile terminal including any one of the above-mentioned systems for protecting the personal information based on the mobile terminal.

In summary, the present disclosure provides a method and a system for protecting personal information based on a mobile terminal and the mobile terminal. The method includes establishing and storing a new content provider module for storing application data and a new position manager module for storing geographical position data in the mobile terminal in advance, and writing default new application data and default new geographical position data into the new content provider module and the new position manager module, respectively; monitoring, in real time, whether an original content provider and an original position manager module in the mobile terminal include a request for reading data from transmitted by an application; if yes, disabling the original content provider and the original position manager module, and displaying the default new application data and the default new geographical position data. In the present disclosure, the new content provider module and the new position manager module are established. New virtual information is written into the two modules. When any other application requires calling the data in the two modules, the mobile terminal outputs the virtual information, thereby protecting the personal information of the user and providing convenience for the user.

Figure 5:
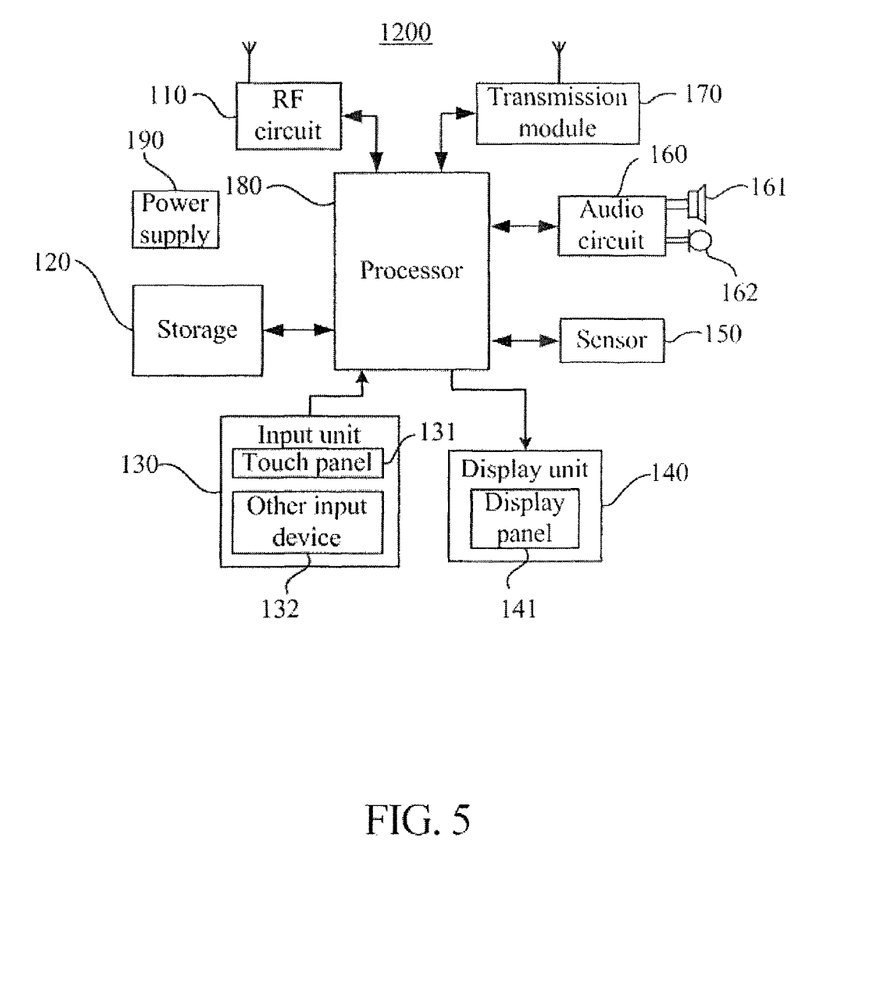
FIG. 5 is a structural block diagram of a mobile terminal provided by the present disclosure.

The present disclosure further provides a mobile terminal. FIG. 5 is a specific structural block diagram of a mobile terminal provided by an embodiment of the present disclosure. The mobile terminal may be used to implement the methods and the systems for protecting the personal information based on the mobile terminal provided by the above-mentioned embodiments. The mobile terminal 1200 may be a mobile phone or a tablet computer.

A shown in FIG. 5, the mobile terminal 1200 includes a radio frequency (RF) circuit 110, a storage 120 with one or more computer readable storage media, an input unit 130, a display unit 140, a sensor 150, an audio circuit 160, a transmission module 170, a processor 180 with one or more cores, and a power supply 190, and so on. One skilled in the art should understand that the structure of the mobile terminal 1200 shown in FIG. 5 does not constitute a limitation for the mobile terminal 1200, and may include more or less components than those illustrated in FIG. 5. Furthermore, the components in FIG. 5 can be combined and/or arranged in different ways other than that shown in FIG. 5.

The RF circuit 110 is configured to receive and transmit electromagnetic waves to implement conversion between the electromagnetic waves and electrical signals, thereby communicating with a communication network or any other device. The RF circuit 110 may include an antenna, an RF transceiver, a digital signal processor, an encryption/decryption chip, one or more magnifier, tuner, one or more oscillator, a subscriber identity module (SIM) card, a storage, and so on. The RF circuit 110 can communicate with various networks, such as internet, an intranet, or a wireless network, or can communicate with other devices via the wireless network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the Institute of Electrical and Electronics Engineers including IEEE802.11a, IEEE802.11b, IEEE 802.11g, and/or IEEE 802.11n), Voice over Internet Protocol (VoIP), Worldwide Interoperability for Microwave Access (Wi-Max), any other protocol for mails, instant communication, and short messages, any other suitable communication protocol, or any other protocol which has not been developed.

The storage 120 can be configured to store software programs and modules, such as the program instructions/modules in the method and system for protecting the personal information based on the mobile terminal of the above-mentioned embodiments. The processor 180 can perform various applications of functions and data processing by operating the software programs and modules stored in the storage 120. The storage 120 may include one or more high-speed RAM, non-volatile memory such as one or more disk storage devices, a memory, or other volatile solid state storage. In some embodiments, the storage 120 also includes a remote storage disposed corresponding to the processor 180. The memory remote storage may be linked to the mobile terminal 1200 via a network. The network may include but not limited to at least one combination of internet, an intranet, a local area network, and a mobile communication network.

The input unit 130 can be configured to receive input numbers or character information, and generate key signal input in relation to user settings and functional control of the mobile phone. Specifically, the input unit 130 includes a touch panel 131 and any other input device 132. The touch panel 131, which is also called a touch screen, can gather a touch operation (for example, use of a finger of a user, a stylus, and any other suitable object or attachment on or near the touch panel 131) and drive a connecting device according to preset programs. Optionally, the touch screen 131 may include a touch-sensitive device and a touch controller. The touch-sensitive device detects a direction of the user's touch, detects signals resulted from the touch operation, and transmits the signals to the touch controller. The touch controller receives information of the touch, converts it into a touch coordinate, further transmits the coordinate to the processor 180, and further receives and executes an instruction from the processor 180. Furthermore, the touch panel 131 may be implemented by utilizing capacitive, resistive, infrared, and surface acoustic wave technologies. In addition, the input unit may further include any other input device 132. Specifically, the input device includes but not limited to one or any of the combination of a physical keyboard, function keys (such as volume control keys, switches keys, etc.), a trackball, a mouse, an operating lever.

The display unit 140 is configured to display input information from the user, information provided for the user, or different kinds of graphical user interfaces of the mobile terminal 1200. The graphical user interfaces may include a graph, a text, an icon, a video, and/or any combination of them. The display unit 140 may include a display panel 141, optionally, which may be a liquid crystal display (LCD) or an Organic Light-Emitting Diode (OLED). Furthermore, the touch panel 131 may cover the display panel 141. When the touch panel 131 detects a touch operation on or near its surface and transmits a corresponding signal to the processor 180 to determine a type of the touch, the processor 180 controls the display panel 141 to provide appropriate visual output according to the type of the touch. Although the touch panel 131 and the display panel 141 in FIG. 5 are two separate components for implementing input and output functions, the touch panel 131 and the display panel 141 may be integrated into one component for implementing the input and output functions in any other embodiment.

The mobile terminal may further include at least one sensor 150, such as a light sensor, a motion sensor, and other sensors. Specifically, the light sensor can include an ambient light sensor and a proximity sensor. The ambient light sensor can adjust the brightness of the display panel 141 according to bright or dark of the ambient light. The proximity sensor can close the display panel 141 and/or the back light when the mobile terminal 1200 is closed to an ear. As one of the motion sensor, a gravity sensor (G-sensor) can be listed. The gravity sensor can detect acceleration speed on all directions (generally up to three axis), can detect magnitude and direction of the gravity when still, and can identify a gesture of the mobile phone application (such as a screen switch between landscape style and portrait style, relevant games, and magnetometer calibration) and identify the vibration function (such as pedometer, and knock), and so on. Additionally, a gyroscope, a barometer, a hygrometer, a thermometer, an infrared sensor, and any other sensor can be configured in the mobile terminal 1200, and the details are not repeated here.

The audio circuit 160, a speaker 161, and a microphone 162 provide an audio interface between the user and the mobile terminal 1200. The audio circuit 160 converts received audio data to an electrical signal and transmits the electrical signal to the speaker 161. The speaker 161 converts the electrical signal to sound signals and outputs the sound signals. In addition, the microphone 162 converts collected sound signal to electrical signals. The audio circuit 160 converts the electrical signal to audio data and transmits the audio data to the processor 180 for processing. After the processing, the audio data may be transmitted to another terminal via the RF circuit 110, or transmitted to the storage 120 for further processing. The audio circuit may further an earphone jack for providing communication between an external earphone and the mobile terminal 1200.

The mobile terminal 1200 can be configured to, by the transmission module 170 (such as a WIFI module) send and receive emails, browse a webpage, and access streaming media, and so on. It provides the user with wireless broadband internet access. It should be understood that this module is not an essential component and can be omitted according to the requirement within the scope of the present disclosure.

The processor 180 functions as a control center of the mobile terminal 1200 and is configured to operatively connect each component of the mobile terminal 1200 using various interfaces and circuits, and is configured to execute the various functions of the mobile terminal 1200 and to perform data processing by operating and/or executing the software programs and/or modules stored in the storage 120 and calling the data stored in the storage 120, thereby monitoring the mobile terminal 1200. Optionally, the processor 180 can include one or more processing cores. Preferably, an application processor and a modulation/demodulation processor can be integrated with the processor 180. The application processor is configured to process an operating system, user interfaces, application programs, and so on. The modulation/demodulation processor is configured to process wireless communication. It is should be understood that the modulation/demodulation processor can be independent of the processor 180.

The mobile terminal 1200 further includes the power supply 190 configured to provide power for the various components of the mobile terminal 1200. Preferably, the power supply 190 can be logically coupled to the processor 180 via a power management system that controls charging, discharging, power consumption, and other functions related to power management. The power supply 190 can include one or more direct current (DC)/or alternating current (AC) power sources, recharging system, power failure detection circuit, power converter or inverter, power supply status indicator, and the like.

Although not shown in FIG. 5, the mobile terminal 1200 may include a camera, a BLUETOOTH module, and so on. They are not repeated herein. In the present embodiment, a display unit of the mobile terminal is a touch screen. The mobile terminal further includes a storage and one or more programs. The one or more programs are stored in the storage. After configuration, one or more processors execute the above-mentioned programs, which include the following operating instructions:

Establishing and storing a new content provider module for storing application data and a new position manager module for storing geographical position data in the mobile terminal in advance, and writing default new application data and default new geographical position data into the new content provider module and the new position manager module, respectively;

Monitoring, in real time, whether an original content provider and an original position manager module in the mobile terminal include a request for reading data transmitted by an application;

If yes, disabling the original content provider and the original position manager module, and displaying the default data of the new application and the default data of the new geographical position;

Activating the original content provider and the original position manager module when the new original content provider and the new position manager module are disabled.

The mobile terminal provided by the embodiment of the present disclosure can be applied to the above-mentioned corresponding embodiment of the method. Detailed descriptions can be referred to those of the above-mentioned embodiment and are not repeated herein.

It should be understood that applications of the present disclosure are not limited to the above-mentioned examples. For one skilled in the art, various modifications and changes could be made according to the above-mentioned descriptions. All modifications and changes should fall within the scope of the appended claims of the present disclosure.

What is claimed is:

1. A method for protecting personal information based on a mobile terminal, comprising steps of:
    establishing a new content provider module for storing application data and a new position manager module for storing geographical position data in the mobile terminal;
    writing default new application data and default new geographical position data into the new content provider module and the new position manager module, respectively;
    monitoring whether a request for reading data is transmitted by an application to an original content provider module and an original position manager module in the mobile terminal;
    disabling the original content provider module and the original position manager module, and displaying the default new application data and the default new geographical position data on a display of the mobile terminal, in response to the request for reading the data;
    activating the original content provider module and the original position manager module when the new content provider module and the new position manager module are disabled;
    detecting that the application in the mobile terminal transmits the request for reading original application data stored in the original content provider module;
    disabling the original content provider module, and enabling the new content provider module;
    reading the default new application data stored in the new content provider module and displaying the same on the display of the mobile terminal; and disabling the new content provider module;
    detecting that the application in the mobile terminal transmits the request for reading original geographical position data stored in the original position manager module;
    disabling the original position manager module, and enabling the new position manager module; and
    reading the corresponding new geographical position data stored in the new position manager module and displaying the same on the display of the mobile terminal; and
    disabling the new position manager module.

2. The method for protecting the personal information based on the mobile terminal of claim 1, wherein the default new application data at least comprises data of an address book and data of a short message.

3. A system for protecting personal information based on a mobile terminal, comprising:
    a display, at least one processor, a memory, one or more modules stored in the memory, when the one or more modules are executed by the at least one processor, the memory causes the at least one processor to perform a method, comprising:
    establishing a new content provider module for storing application data and a new position manager module for storing geographical position data in the memory, wherein the mobile terminal comprises an operating system, and a framework of the operating system comprises an original content provider module and an original position manager module;
    writing default new application data and default new geographical position data into the new content provider module and the new position manager module, respectively;
    monitoring, in real time, whether a request for reading data is transmitted by an application to the original content provider module and the original position manager module in the memory;
    disabling the original content provider module and the original position manager module, and displaying the default new application data and the default new geographical position data on the display, in responsive to the request for reading the data;
    activating the original content provider module and the original position manager module when the new content provider module and the new position manager module are disabled;
    detecting that the application in the mobile terminal transmits the request for reading original application data stored in the original content provider module;
    disabling the original content provider module, and enabling the new content provider module;
    reading the default new application data stored in the new content provider module and displaying the same on the display of the mobile terminal; and disabling the new content provider module;
    detecting that the application in the mobile terminal transmits the request for reading original geographical position data stored in the original position manager module;
    disabling the original position manager module, and enabling the new position manager module; and
    reading the corresponding new geographical position data stored in the new position manager module and displaying the same on the display of the mobile terminal; and
    disabling the new position manager module.

4. The system for protecting the personal information based on the mobile terminal of claim 3, wherein the establishing the new content provider module for storing application data and the new position manager module for storing geographical position data in the memory comprises:

establishing the new content provider module for storing the application data and the new position manager module for storing the geographical position data in the memory in advance;

writing the default new application data into the new content provider module; and writing the default new geographical position data into the new position manager module.

5. The system for protecting the personal information based on the mobile terminal of claim 3, wherein the default new application data at least comprises data of an address book and data of a short message.

6. A mobile terminal, comprising:

a display, at least one processor, a memory, one or more modules stored in the memory, when the one or more modules are executed by the at least one processor, the memory causes the at least one processor to perform a method, comprising:

establishing a new content provider module for storing application data and a new position manager module for storing geographical position data in the memory, wherein the mobile terminal comprises an operating system, and a framework of the operating system comprises an original content provider module and an original position manager module;

writing default new application data and default new geographical position data into the new content provider module and the new position manager module, respectively;

monitoring, in real time, whether a request for reading data is transmitted by an application to the original content provider module and the original position manager module in the memory;

disabling the original content provider module and the original position manager module, and displaying the default new application data and the default new geographical position data on the display, in responsive to the request for reading the data;

activating the original content provider module and the original position manager module when the new content provider module and the new position manager module are disabled;

detecting that the application in the mobile terminal transmits the request for reading original application data stored in the original content provider module;

disabling the original content provider module, and enabling the new content provider module;

reading the default new application data stored in the new content provider module and displaying the same on the display of the mobile terminal; and disabling the new content provider module;

detecting that the application in the mobile terminal transmits the request for reading original geographical position data stored in the original position manager module;

disabling the original position manager module, and enabling the new position manager module; and reading the corresponding new geographical position data stored in the new position manager module and displaying the same on the display of the mobile terminal; and disabling the new position manager module.

7. The mobile terminal of claim 6, wherein the establishing the new content provider module for storing application data and the new position manager module for storing geographical position data in the memory comprises:

establishing the new content provider module for storing the application data and the new position manager module for storing the geographical position data in the memory in advance;

writing the default new application data into the new content provider module; and writing the default new geographical position data into the new position manager module.

8. The mobile terminal of claim 6, wherein the default new application data at least comprises data of an address book and data of a short message.

* * * * *